(12) United States Patent
Namito

(10) Patent No.: US 8,939,440 B2
(45) Date of Patent: Jan. 27, 2015

(54) VIBRATION ABSORPTION DEVICE

(75) Inventor: Norikatsu Namito, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 136 days.

(21) Appl. No.: 13/259,027

(22) PCT Filed: Mar. 25, 2010

(86) PCT No.: PCT/JP2010/055293
§ 371 (c)(1),
(2), (4) Date: Oct. 13, 2011

(87) PCT Pub. No.: WO2010/110399
PCT Pub. Date: Sep. 30, 2010

(65) Prior Publication Data
US 2012/0018937 A1    Jan. 26, 2012

(30) Foreign Application Priority Data

Mar. 25, 2009  (JP) .................................. 2009-073413

(51) Int. Cl.
*F16F 1/38*    (2006.01)

(52) U.S. Cl.
CPC ......... *F16F 1/3842* (2013.01); *F16F 2226/045* (2013.01); *F16F 2228/08* (2013.01)
USPC ........................................ 267/293; 267/141.2

(58) Field of Classification Search
USPC ........................... 267/141.2, 140.12, 141, 293
See application file for complete search history.

(56) References Cited

U.S. PATENT DOCUMENTS

2004/0108639 A1\* 6/2004 Kato et al. .................... 267/141
2006/0131800 A1   6/2006 Hori et al.

(Continued)

FOREIGN PATENT DOCUMENTS

JP    2004239375 A    8/2004
JP    2004-308865 A   11/2004

(Continued)

OTHER PUBLICATIONS

International Search Report for PCT/JP2010/055293 dated Apr. 27, 2010.

(Continued)

*Primary Examiner* — Bradley King
(74) *Attorney, Agent, or Firm* — Sughrue Mion, PLLC

(57) ABSTRACT

A vibration absorption device includes a cylindrical bracket coupled with one of a vibration generating section and a vibration receiving section and having an inner surface formed in a linear shape in a cylinder axial direction, an external cylinder made of resin and including a small diameter section that is formed in a cylindrical shape, press-fit into a cylinder of the bracket, and has a small diameter surface formed to an outer surface configured to a press-fit leading end to the bracket, a large diameter section that has an outer diameter larger than the inner diameter of the bracket and the outer diameter of the small diameter section and a thickness which is configured to a portion nearer to a press-fit rear end side to the bracket than the small diameter section and is thicker than the small diameter section before the press-fit, and a large diameter surface formed to an outer surface, and an intermediate section that is configured between the small diameter section and the large diameter section and has a standing surface formed on an outer surface for coupling the small diameter surface and the large diameter surface, an internal cylinder that is disposed to an inner peripheral side of the external cylinder as well as coupled with the other of the vibration generating section and the vibration receiving section, and an elastic body that is interposed between an inner peripheral surface of the external cylinder and an outer peripheral surface of the internal cylinder for coupling the external cylinder and the internal cylinder to each other.

7 Claims, 11 Drawing Sheets

(56) References Cited

U.S. PATENT DOCUMENTS

| | | |
|---|---|---|
| 2007/0262503 A1* | 11/2007 | Rogge et al. .............. 267/141.2 |
| 2008/0284076 A1 | 11/2008 | Miyahara et al. |
| 2011/0109027 A1* | 5/2011 | Ito et al. .................... 267/141.2 |

FOREIGN PATENT DOCUMENTS

| | | |
|---|---|---|
| JP | 2006-17312 A | 1/2006 |
| JP | 3767545 B2 | 4/2006 |
| JP | 2006-144972 A | 6/2006 |
| JP | 2008-249035 A | 10/2008 |
| JP | 2008-286345 A | 11/2008 |

OTHER PUBLICATIONS

Japanese Office Action dated Oct. 29, 2013, issued in corresponding Japanese Patent Application No. 2009-073413.

Chinese Office Action dated Dec. 24, 2013, issued in corresponding Chinese Patent Application No. 201080013311.1.

* cited by examiner

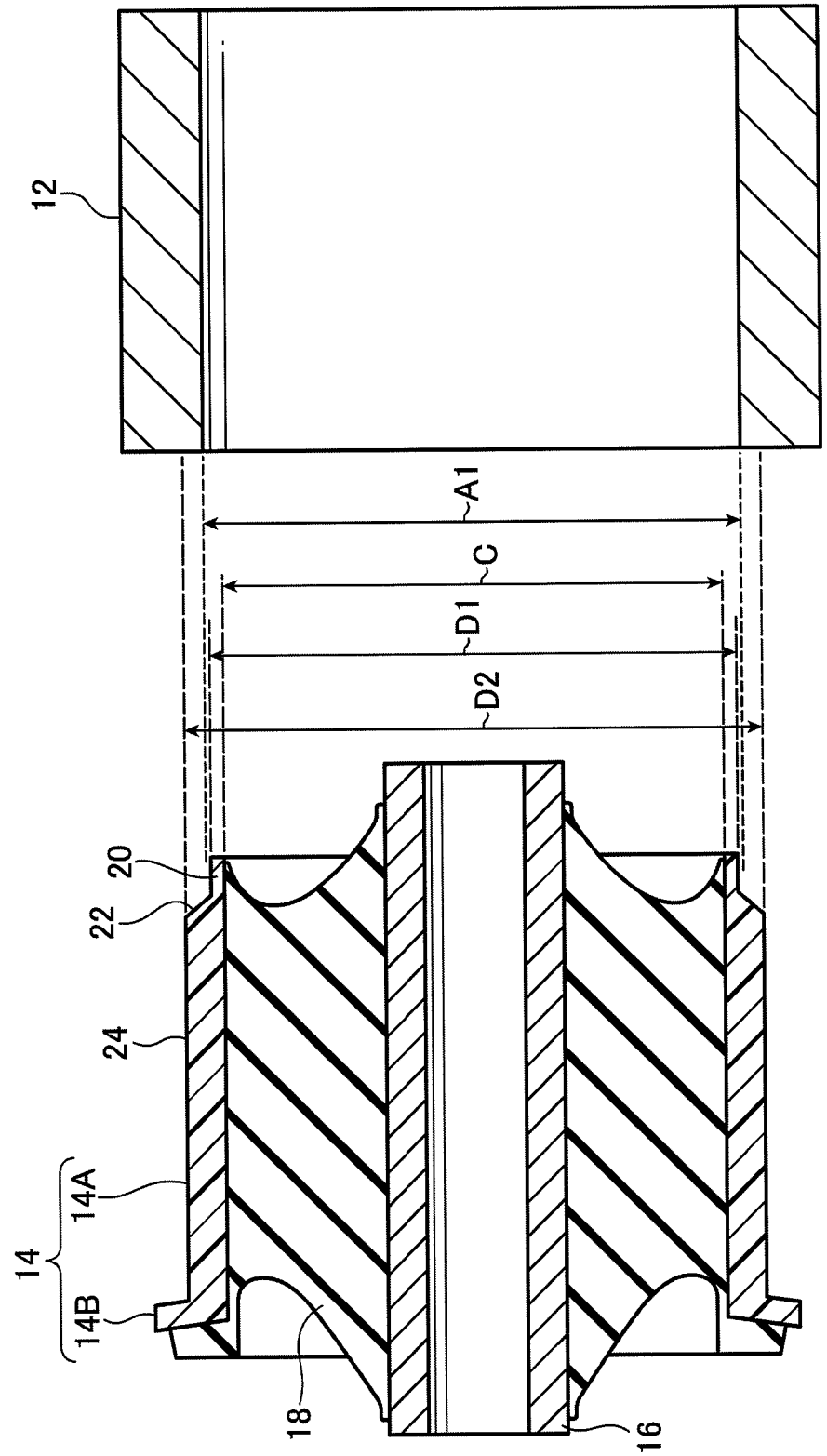

VIBRATION ABSORPTION DEVICE

CROSS REFERENCE TO RELATED APPLICATIONS

This application is a National Stage of International Application No. PCT/JP2010/055293 filed on Mar. 25, 2010, which claims priority from Japanese Patent Application No. 2009-073413, filed on Mar. 25, 2009, the contents of all of which are incorporated herein by reference in their entirety.

TECHNICAL FIELD

The present invention relates to a so-called bush type vibration absorption device attached to a rear suspension arm, a trading arm, a torque rod, or another arm member of a vehicle.

BACKGROUND ART

As an external cylinder of a bush type vibration absorption device, although an external cylinder made of metal has been conventionally used, an external cylinder made of resin is also employed. The resin external cylinder has a merit in that it is light in weight and can be readily molded.

In contrast, when the external cylinder is made of resin, since the strength of resin is lower than that of metal, if an extraction force is increased and the resin external cylinder is press-fit into a bracket, it is possible that the external cylinder will be damaged.

Thus, in Japanese Patent No. 3767545, in a cylindrical vibration absorption device composed of a rubber bush which has a resin external cylinder, an internal cylinder, and a rubber elastic body interposed therebetween and is press-fit into a rigid bracket, an inner surface shape of the bracket is formed in a stepped-shape by forming a recess at the inner surface of the bracket, whereas an outer surface of the external cylinder is formed in a substantially straight shape in an axial direction, the external cylinder is press-fit into the bracket while reducing the diameter of the external cylinder making use of the elastic deformation of the resin, and a step of the bracket and a step of the external cylinder are engaged with each other in the axial direction as well as in an extracting direction by an elastic restoring force after the press fit.

Further, in Japanese Patent No. 3767545, various innovations are made such that a fastening force of the external cylinder is secured by increasing a friction coefficient by making a surface of the bracket rough by subjecting the inner surface the bracket to a blast process, an engaging projection is formed at an end of the external cylinder and abutted to an end surface of the bracket so as to prevent removal, or the like.

However, the following disadvantages occur in Japanese Patent No. 3767545. That is, when the recessed section is formed at the inner surface of the bracket and when the surface is made rough, processing is time-consuming and costs are increased. Further, when the engaging projection is formed at one end of the external cylinder, the engaging projection is exposed outside of the bracket.

DISCLOSURE OF INVENTION

Technical Problem

An object of the present invention, which was made in consideration of the foregoing circumstances, is to provide a vibration absorption device capable of securing a fastening force between a bracket and an external cylinder with a simple configuration.

Solution to Problem

To achieve the object, a vibration absorption device according to a first aspect of the invention includes a cylindrical bracket coupled with one of a vibration generating section or a vibration receiving section and having an inner surface formed in a linear shape in a cylinder axial direction; an external cylinder made of resin and including: a small diameter section that is formed in a cylindrical shape, is press-fit into a cylinder of the bracket, and has a small diameter surface formed at an outer surface and configured at a press-fitting leading end with respect to the bracket; a large diameter section that, before the press-fitting, has an outer diameter that is larger than an inner diameter of the bracket and an outer diameter of the small diameter section, and has a large diameter surface formed at an outer surface, having a thickness that is thicker than the small diameter section, and configured at a portion nearer to a press-fitting rear end side with respect to the bracket than the small diameter section; and an intermediate section that is configured between the small diameter section and the large diameter section and has a standing surface formed at an outer surface that joins the small diameter surface and the large diameter surface; an internal cylinder that is disposed at an inner peripheral side of the external cylinder and is coupled with the other one of the vibration generating section or the vibration receiving section; and an elastic body that is interposed between the inner peripheral surface of the external cylinder and an outer peripheral surface of the internal cylinder, and that joins the external cylinder and the internal cylinder to each other.

In the vibration absorption device configured as described above, since the inner surface of the bracket is formed in a linear shape in the cylinder axial direction, processing for forming a step at the inner surface of the bracket, or the like, is unnecessary and the bracket can be easily manufactured.

In the vibration absorption device of the invention, the outer diameter of the small diameter section of the press-fitting leading end of the external cylinder with respect to the bracket is made smaller than the outer diameter of the large diameter section configured at the press-fitting rear end side with respect to the bracket. In the press-fitting into the bracket, the press-fitting leading end becomes the starting point of damage such as cracking of the external cylinder, and damage due to compression distortion is particularly large. Thus, damage to the press-fitting leading end can be suppressed by forming the small diameter section at the press-fitting leading end.

In contrast, at the press-fitting rear end side, damage due to compression distortion when press-fitting into the bracket is not as serious at the press-fitting leading end side. Thus, to increase the extraction force by securing a tightening margin with the bracket, the outer diameter of the large diameter section is increased to a large diameter.

As described above, damage such as cracking or the like can be suppressed while securing the extraction force of the external cylinder by forming the large diameter section and the small diameter section.

Further, in the vibration absorption device of the invention, the intermediate section is configured between the small diameter section and the large diameter section of the external cylinder, and the small diameter surface is joined to the large diameter surface by the standing surface of the intermediate section. Accordingly, compression distortion of the press-fitting leading end can be suppressed while securing the thickness of the small diameter section, differently from a case in which the press-fitting leading end is simply formed in a tapered shape.

Further, in the vibration absorption device of the configuration, since the thickness of the large diameter section is made thicker than the small diameter section, the strength of the large diameter section, which is subject to a large amount of compression distortion, can be secured.

A vibration absorption device according to a second aspect of the invention has the feature that an inner surface of the external cylinder is formed in a linear shape in an axial direction.

As described above, when the inner surface of the external cylinder is formed in a linear shape in the axial direction, the durability of an elastic body disposed inside the external cylinder can be increased in comparison to the case in which a step or the like is formed.

A vibration absorption device according to a third aspect of the invention has the feature that the outer diameter of the small diameter section of the external cylinder is equal to or larger than the inner diameter of the bracket before the small diameter section is inserted into the bracket.

When the outer diameter of the small diameter section is set as described above, compression distortion of the small diameter section can be reduced while securing the thickness of the small diameter section.

A vibration absorption device according to a fourth aspect of the invention has the feature that the outer diameter of the small diameter section of the external cylinder is equal to or smaller than the inner diameter of the bracket before the small diameter section is inserted into the bracket.

When the outer diameter of the small diameter section is set as described above, compression distortion of the small diameter section at the time of press-fitting can be suppressed.

Advantageous Effects of Invention

As described above, according to the invention, the fastening force of the bracket and the external cylinder can be secured with a simple configuration.

BRIEF DESCRIPTION OF DRAWINGS

FIG. 6 is a view showing a state before the external cylinder is press-fit into the bracket in an example in which the outer diameter of a small diameter section is smaller than the inner diameter of the bracket.

BEST MODE FOR CARRYING OUT THE INVENTION

Figure 1:
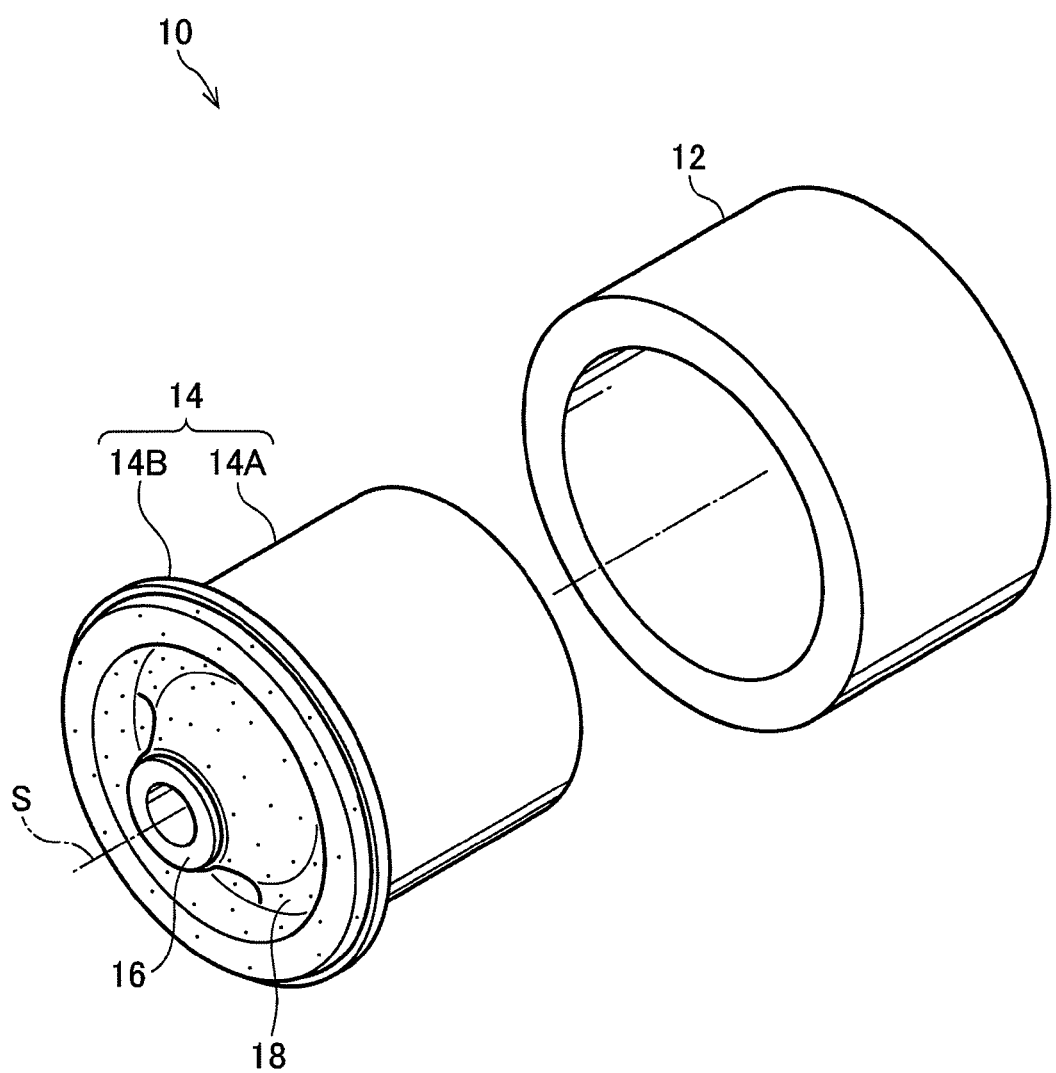
FIG. 1 is an exploded perspective view showing a configuration of a vibration absorption device according to an embodiment of the present invention.

A vibration absorption device and a manufacturing method of the vibration absorption device according to an embodiment of the present invention will be described below referring to the drawings.

Figure 2:
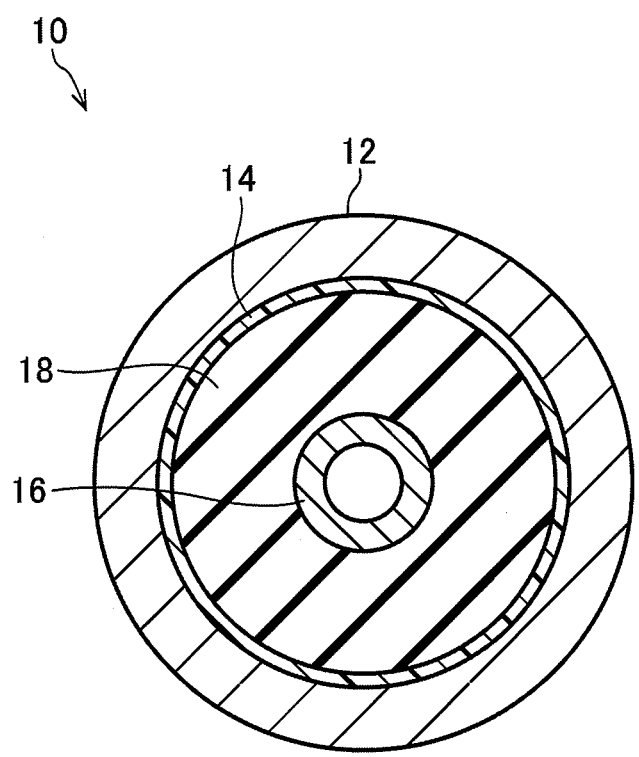
FIG. 2 is a cross-sectional view of the vibration absorption device according to the embodiment of the present invention when viewed from an axial direction.
Figure 3:
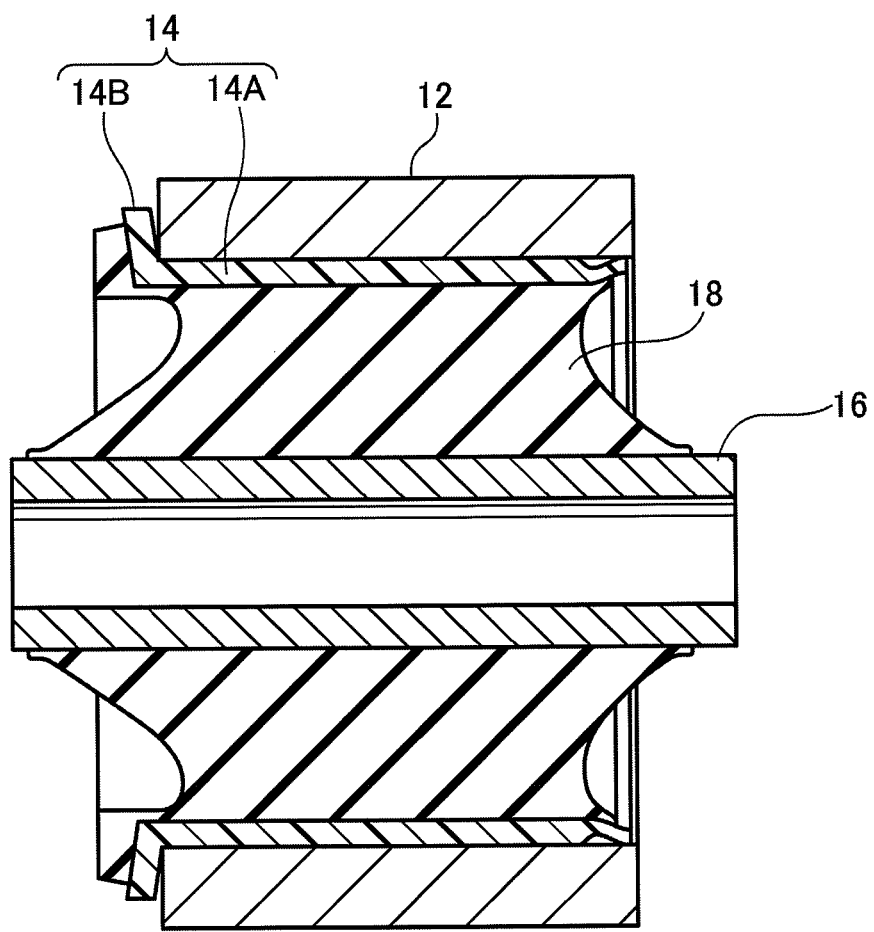
FIG. 3 is a side cross-sectional view of the vibration absorption device according to the embodiment of the present invention.

FIGS. 1 to 3 show a vibration absorption device 10 according to the present embodiment. The vibration absorption device 10 has a bracket 12, an external cylinder 14, an internal cylinder 16, and a rubber elastic body 18.

The bracket 12 is formed in a cylindrical shape, and an inner surface of a cylinder is formed in a linear shape in an axial direction S of the cylinder with a flush shape without steps or the like. The inner diameter of the bracket 12 is shown by A1.

The external cylinder 14 has a cylinder section 14A and a flange section 14B. The cylinder section 14A is formed in a cylindrical shape, and the flange section 14B is configured continuously with an outer side in a radial direction of an end of the cylinder section 14A and is formed in a ring shape.

The external cylinder 14 is made of resin. As the resin, polyamide, polyacetal, polycarbonate, polybutyleneterephtalate or the like can be used. Further, to reinforce the resin, a fiber-reinforced material is preferably mixed in. As the fiber-reinforced material, glass fiber, carbon fiber, aramid fiber, or the like can be used. The external cylinder 14 can be formed by injection molding or the like.

Figure 4:
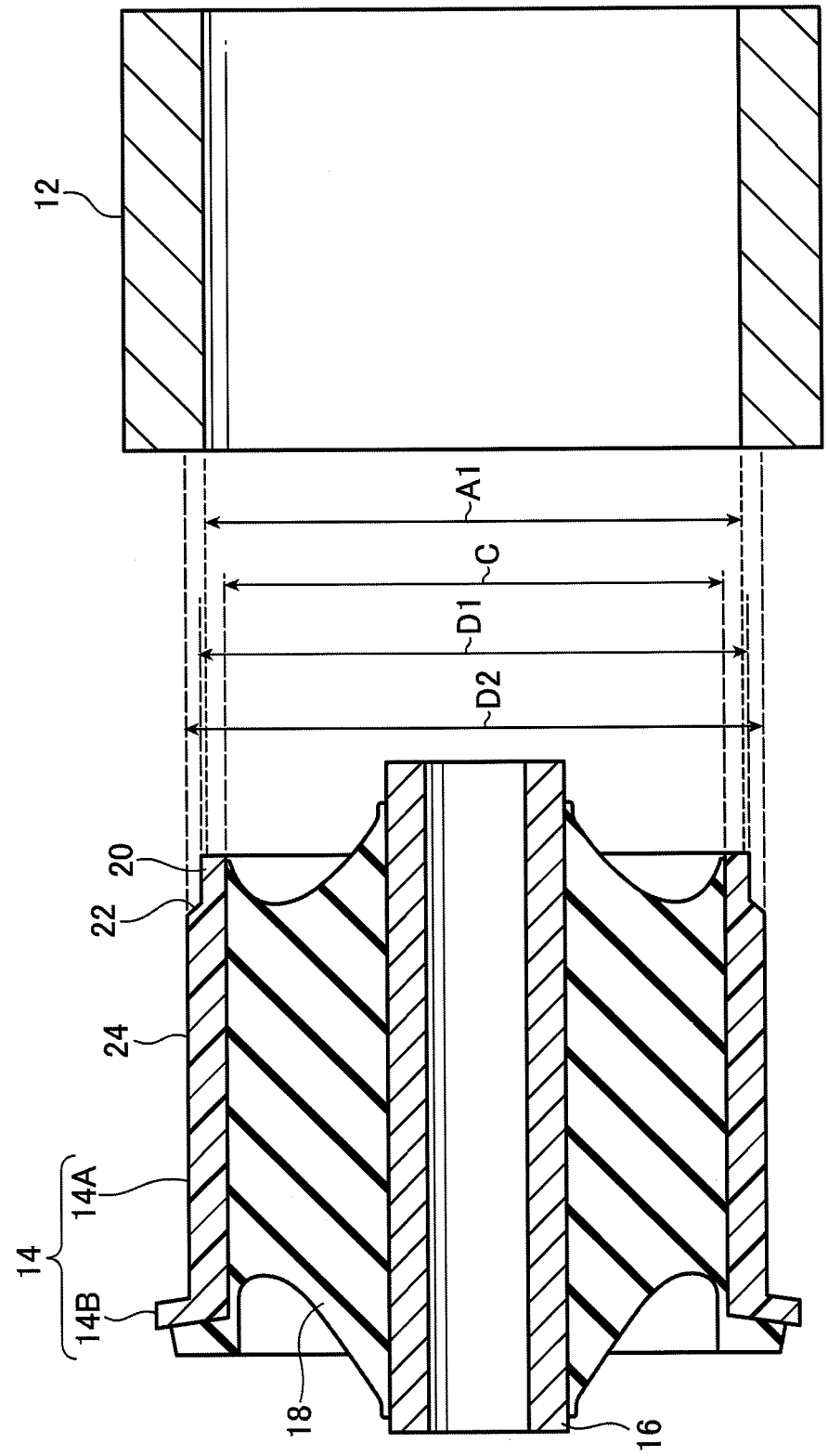
FIG. 4 is a view showing a state before an external cylinder is press-fit into a bracket in FIG. 3.
Figure 5:
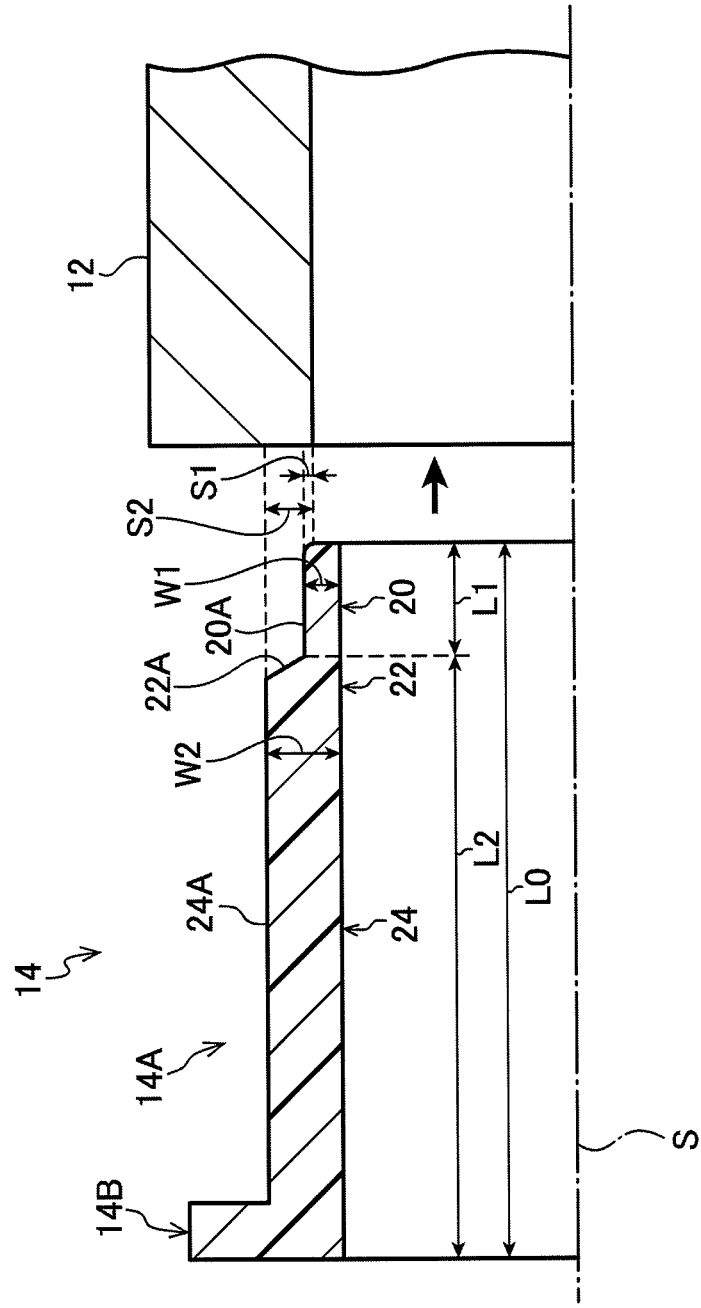
FIG. 5 is a half cross-sectional view showing the relationship between the bracket and the external cylinder of the embodiment of the present invention.

As shown in FIGS. 4 and 5, a leading end of the external cylinder 14 in the axial direction S at which the flange section 14B is not configured is formed with a small diameter section 20. Before being press-fit to the bracket 12, the small diameter section 20 has a certain outer diameter of D1 and an inner diameter set as C. An outer periphery of the small diameter section 20 is configured with a small diameter surface 20A. Further, the thickness of the small diameter section 20 is set as W1.

A large diameter section 24 is formed at a portion of the external cylinder 14 nearer to the flange section 14B than the small diameter section 20, extending to the flange section 14B. Before being press-fit to the bracket 12, the outer diameter of the large diameter section 24 is set as D2 and an inner diameter is set as C. An outer periphery of the large diameter section 24 is configured with a large diameter surface 24A. Further, the thickness of the large diameter section 24 is set as W2.

An intermediate section 22 is formed between the small diameter section 20 and the large diameter section 24. The inner diameter of the intermediate section 22 is set as C. An outer periphery of the intermediate section 22 is configured with a standing surface 22A for joining the small diameter surface 20A with the large diameter surface 24A. The standing surface 22A is formed in a tapered shape in which the diameter increases from the small diameter section 20 side to the large diameter section 24 side. A step is formed between the small diameter surface 20A and the standing surface 22A.

The outer diameter D1 of the small diameter section 20 is made slightly larger than the inner diameter A1 of the bracket 12 and is made smaller than the outer diameter D2 of the large diameter section 24. That is, inner diameter A1<outer diameter D1<outer diameter D2 is established. Further, a tightening margin when the external cylinder 14 is press-fit into the bracket 12 is set as S1 in the small diameter section 20 and is set as S2 in the large diameter section 24. The relationship between the tightening margin S1 and the tightening margin S2 is S1<S2. The tightening margin S1 is made sufficiently small so that no damage occurs at the small diameter section 20.

Further, in the present embodiment, although inner diameter A1<outer diameter D1<outer diameter D2 is established, as shown in FIG. 6, outer diameter D1<inner diameter A1<outer diameter D2 may be established. As described above, the tightening margin of the small diameter section 20 when the external cylinder 14 is press-fit into the bracket 12 is set as 0 by making the outer diameter D1 of the small diameter section 20 smaller than the inner diameter A1 of the bracket 12, thereby reducing the load on the small diameter section 20.

Further, the outer diameter D1 may be the same diameter as the inner diameter A1 or smaller than the inner diameter A1.

Further, the outer diameter D1 of the small diameter section 20 is preferably the inner diameter A1 of the bracket 12+10% or less. Compression distortion of the press-fitting leading end of the external cylinder can be effectively reduced by setting the outer diameter D1 of the small diameter section 20 within this range.

Further, the thickness W1 of the small diameter section 20 is preferably 30% to 90% of the thickness W2 of the large diameter section 24. Rigidity of the press-fitting leading end of the external cylinder 14 can be secured by setting the thickness W1 of the small diameter section 20 within this range, whereby deformation and buckling can be effectively suppressed.

An inner surface of the external cylinder 14 is formed in a linear shape in the axial direction S and formed in a flush shape without steps. A surface of the rubber elastic body 18 can also be formed in a flush shape by forming the inner surface of the external cylinder 14 in a flush shape. Accordingly, no stress is concentrated at a specific position (a step section or the like) of the rubber elastic body 18, whereby durability of the rubber elastic body 18 can be improved.

Note that the inner surface of the external cylinder 14 may be formed in a tapered shape and may be configured with a step instead of being formed in the linear shape in the axial direction S. In this case, too, the thickness of the large diameter section 24 is thicker than the thickness of the small diameter section 20.

Further, the length L1 of the small diameter section 20 in the axial direction S is preferably 3% to 50% of the length L0 of the external cylinder 14 in the axial direction S. Compression distortion of the press-fitting leading end of the external cylinder 14 can be effectively reduced by setting the length L1 of the small diameter section 20 in the axial direction S within this range.

Further, the length L2 of the large diameter section 24 in the axial direction S is preferably 50% to 95% of the length L0 of the external cylinder 14 in the axial direction S. An extraction force between the large diameter section 24 and the bracket 12 can be secured by setting the length L2 of the large diameter section 24 in the axial direction S within this range.

As shown in FIGS. 1 to 4, the cylindrical internal cylinder 16 is disposed on an inner peripheral surface side of the external cylinder 14 along the axial direction S. The rubber elastic body 18 is interposed between an outer peripheral surface of the internal cylinder 16, and the inner peripheral surface of the external cylinder 14, and the internal cylinder 16 is elastically joined to the external cylinder 14 by the rubber elastic body 18. An inner peripheral side of the rubber elastic body 18 is vulcanized and bonded to the outer peripheral surface of the internal cylinder 16 and an outer peripheral side of the rubber elastic body 18 is vulcanized and bonded to an inner peripheral surface of the external cylinder 14.

The external cylinder 14 is press-fit into the bracket 12. The bracket 12 is coupled with one of a vibration generating section or a vibration receiving section of a vehicle by a coupling section that is not shown. A coupling shaft (not-shown) is inserted into the internal cylinder 16, and the internal cylinder 16 is securely fastened to the coupling shaft in the state in which the coupling shaft is inserted therethrough. The internal cylinder 16 is coupled with the other of the vibration generating section or the vibration receiving section of the vehicle via the coupling shaft.

Next, a manufacturing method of the vibration absorption device 10 will be described.

First, the external cylinder 14 and the internal cylinder 16 are set in a vulcanizing/molding mold (not-shown) of the rubber elastic body 18 so as to be coaxial with each other. Then, a rubber material is injected into the mold and vulcanized. The rubber elastic body 18 is bonded to the outer peripheral surface of the internal cylinder 16 and the inner surface of the external cylinder 14 by the vulcanization.

Next, a set of the external cylinder 14, internal cylinder 16, and rubber elastic body 18 is press-fit from the small diameter section 20 side of the external cylinder 14 to the inner peripheral side of the bracket 12 by a press-fitting press apparatus.

In the press-fitting, first, the small diameter section 20 is press-fit into the bracket 12 by the tightening margin S1, and subsequently the intermediate section 22 is press-fit while gradually increasing the tightening margin from S1 to S2, and finally the large diameter section 24 is press-fit by the tightening margin S2.

In the present embodiment, since the tightening margin S1 of the small diameter section 20 is made sufficiently small that no damage occurs at the small diameter section 20, compression distortion of the leading end of the external cylinder 14, which tends to become the starting point of cracking or the like, is made sufficiently small, thereby suppressing damage to the press-fitting leading end.

Further, in the present embodiment, since the leading end at which damage tends to occur is protected by reducing the compression distortion of the small diameter section 20, the extraction force is secured by increasing the tightening margin S2 of the large diameter section 24, whereby fastening to the bracket 12 can be strongly performed by securing the extraction force.

Here, a point of difference between a case in which an external cylinder is configured by forming a section corresponding to the small diameter section 20 and the intermediate section 22 of the present embodiment simply in a tapered shape, and the present embodiment itself will be described.

Figure 7A:
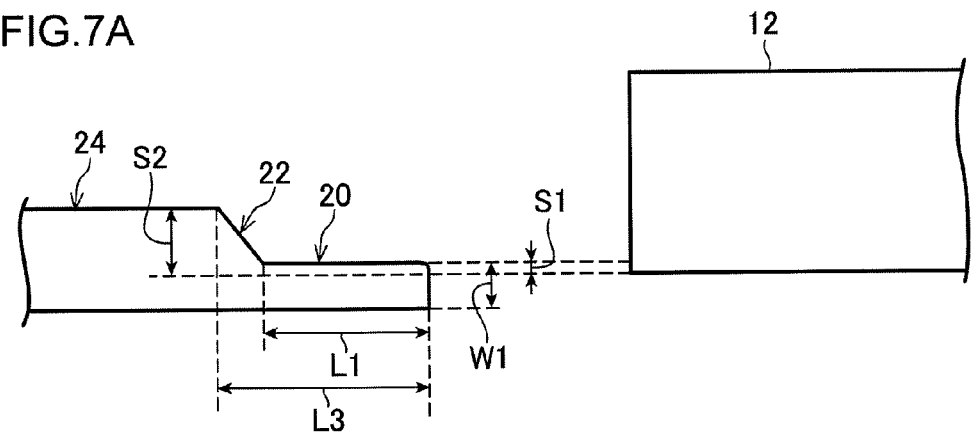
FIG. 7A is an explanatory view of the external cylinder of the embodiment of the present invention.
Figure 7B:
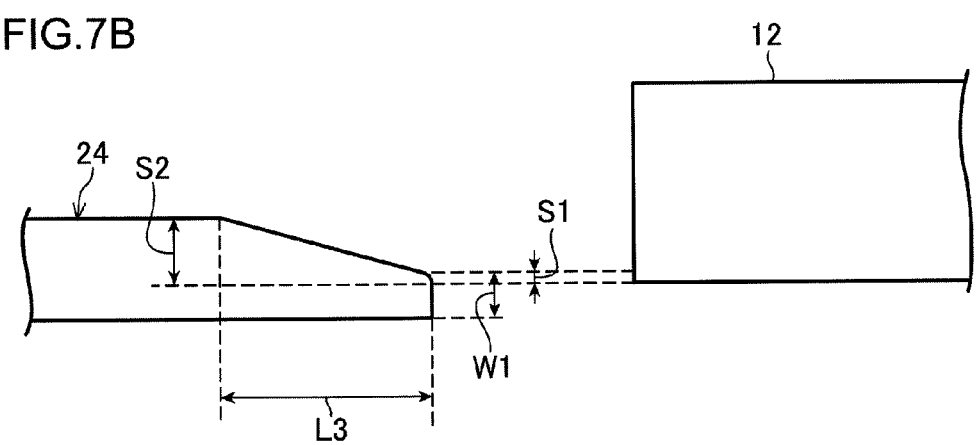
FIG. 7B is an explanatory view of an external cylinder according to a comparative example.
Figure 7C:
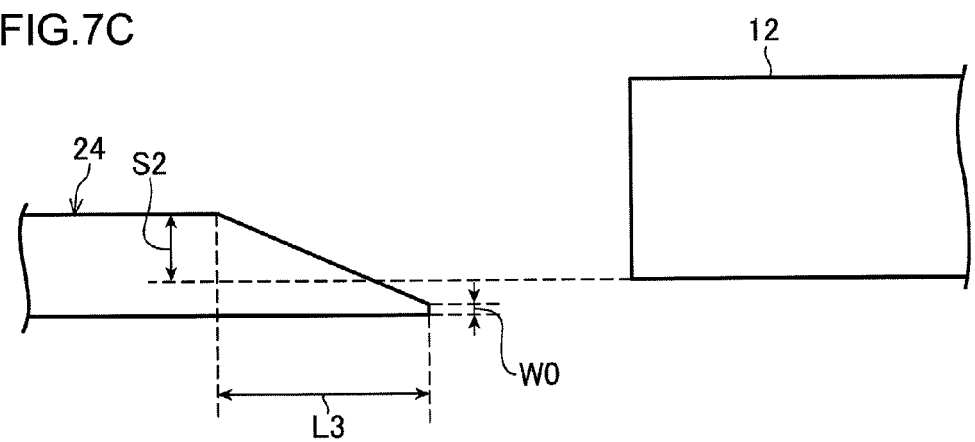
FIG. 7C is an explanatory view of an external cylinder according to a comparative example.

FIGS. 7A to 7C show the relation between the press-fitting leading end of the external cylinder and an opening of the bracket 12. FIG. 7A shows the external cylinder 14 according to the present embodiment. In FIG. 7A, the external cylinder 14 is press-fit by the tightening margin S1 up to the length L1 of the small diameter section 20 in the axial direction and the tightening margin gradually increases to S1-S2 in the intermediate section 22.

FIG. 7B shows a configuration (a comparative example 1) in which a section corresponding to the small diameter section 20 and the intermediate section 22 (from an leading end to a section of a length L3 in the axial direction) is formed simply in a tapered shape while keeping the thickness W1 of the small diameter section 20. FIG. 7C shows a configuration (comparative example 2) in which the section corresponding to the small diameter section 20 and the intermediate section 22 of the present embodiment (from the leading end to the section of the length L3 in the axial direction) is formed in a tapered shape so that a tightening margin of the section is minimized.

In the comparative example 1, although the thickness W1 of the press-fitting leading end of the external cylinder is secured, the tightening margin becomes very large in comparison with the present embodiment. Accordingly, the effect of reducing compression distortion of the leading end is small.

Further, in the comparative example 2, although compression distortion is reduced in comparison with the comparative example 1, since the thickness W0 of the press-fitting leading end of the external cylinder becomes near to 0, the leading end has low rigidity and is deformed (buckled) during press-fitting.

In the present embodiment, since compression distortion is suppressed in the small diameter section 20 and an outer surface is caused to stand at an outer side in the radial direction in the intermediate section 22 and is continuous with the large diameter surface 24A, as regards the leading section, compression distortion can be effectively reduced while securing the thickness in comparison with a case in which it is simply formed in a tapered shape.

Figure 8:
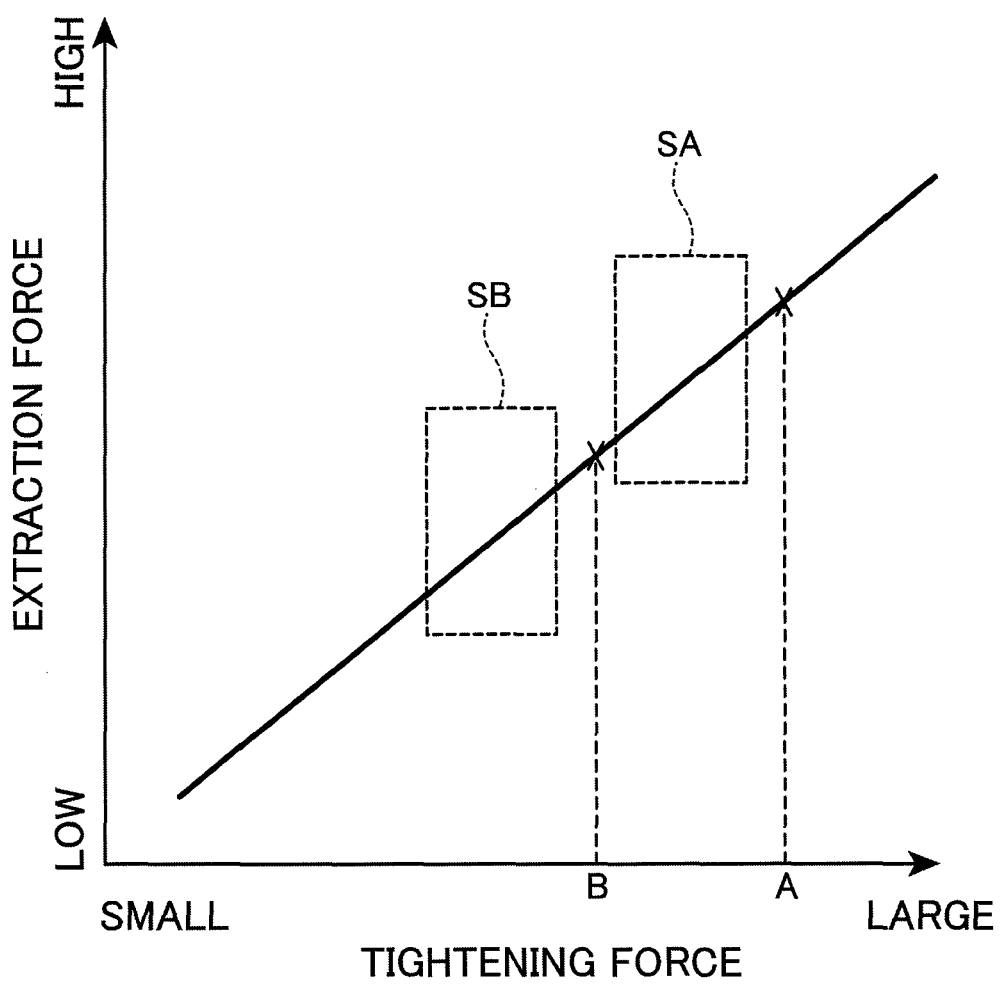
FIG. 8 is a graph showing the relationship between an extraction force and a tightening margin of the external cylinder of the embodiment of the present invention and the external cylinder according to the comparative example.

FIG. 8 shows a graph showing the relationship between the tightening margin S2 and the extraction force and the timing at which cracking occurs with respect to the external cylinder 14 of the present embodiment and the external cylinder of the comparative example 1. An increase of the tightening margin S2 can cause the extraction force to increase, and when the tightening margin becomes B, cracking occurs in the comparative example 1. Thus, in the comparative example 1, it is necessary to set the set range of the tightening margin to SB, which is smaller than B. In contrast, in the present embodiment, since a tightening margin in which cracking occurs becomes A, which is larger than B, the set range of the tightening margin can be set at SA, which is larger SB, whereby a large extraction force can be obtained.

Figure 9A:
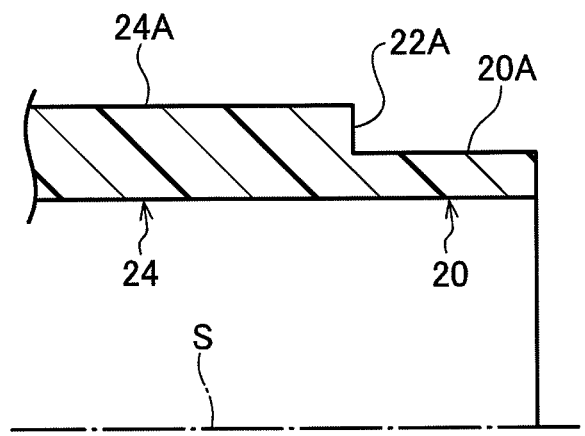
FIG. 9A is a cross-sectional view showing a part of an external cylinder according to a modified example of the embodiment of the present invention.
Figure 9B:
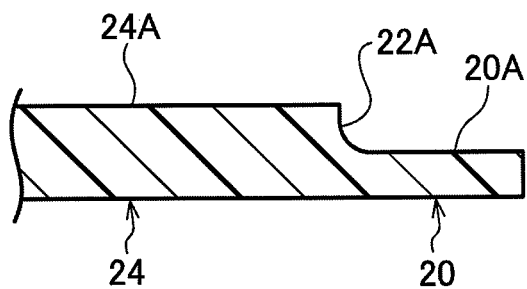
FIG. 9B is a cross-sectional view showing a part of an external cylinder according to a modified example of the embodiment of the present invention.

Further, in the present embodiment, although the standing surface 22A of the intermediate section 22 of the external cylinder 14 is formed in a tapered shape, as shown in FIG. 9A, the standing surface 22A may be configured in a direction perpendicular to the axial direction S, and a cross-section of a step may have a right angle. In this case, as shown in FIG. 9B, the step between the standing surface 22A and the small diameter surface 20A may be formed in an R shape.

Figure 10A:
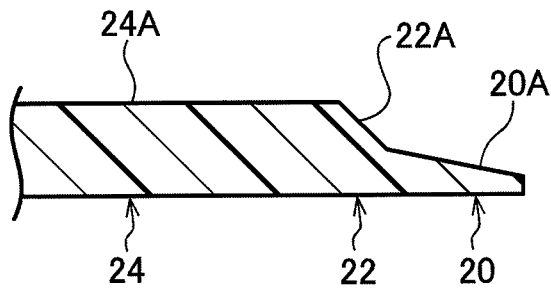
FIG. 10A is a cross-sectional view showing a part of an external cylinder according to a modified example of the embodiment of the present invention.
Figure 10B:
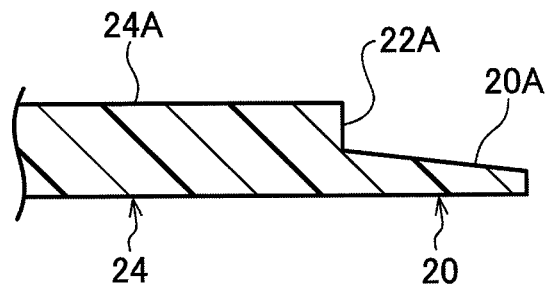
FIG. 10B is a cross-sectional view showing a part of an external cylinder according to a modified example of the embodiment of the present invention.
Figure 10C:
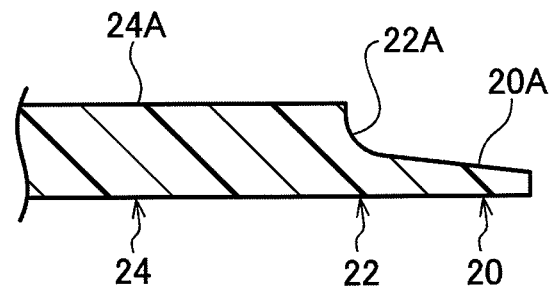
FIG. 10C is a cross-sectional view showing a part of an external cylinder according to a modified example of the embodiment of the present invention.

Further, in the present embodiment, although the small diameter section 20 of the external cylinder 14 is provided with the certain thickness W1, as shown in FIGS. 10A to 10C, the small diameter surface 20A of the small diameter section 20 may be configured in a tapered shape. FIG. 10A is an example in which the standing surface 22A is formed in a tapered shape, FIG. 10B is an example in which the standing surface 22A faces a direction perpendicular to the axial direction S, and FIG. 10C is an example in which the step between the standing surface 22A and the small diameter surface 20A is formed in an R shape.

Figure 11:
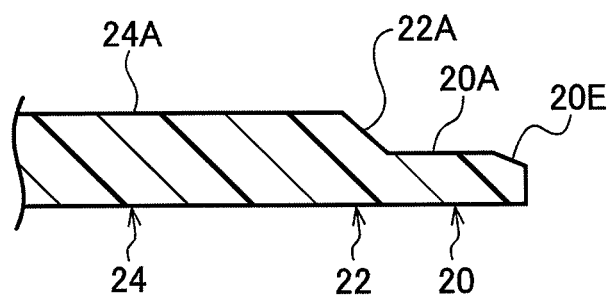
FIG. 11 is a cross-sectional view showing a part of an external cylinder according to a modified example of the embodiment of the present invention.

Further, as shown in FIG. 11, a leading end of the small diameter section 20 of the external cylinder 14 may be formed in a taper shape and an leading end taper section 20E may be configured.

The invention claimed is:

1. A vibration absorption device comprising:
   a cylindrical bracket having a constant inner diameter, coupled with one of a vibration generating section or a vibration receiving section and having an inner surface formed in a linear shape in a cylinder axial direction;
   an external cylinder made of resin and including: a small diameter section that is formed in a cylindrical shape, is press-fit into a cylinder of the bracket, and has a small diameter surface formed at an outer surface and configured at a press-fitting leading end with respect to the bracket;
   a large diameter section that, before the press-fitting, has an outer diameter that is larger than an inner diameter of the bracket and an outer diameter of the small diameter section, and has a large diameter surface formed at an outer surface, having a thickness that is thicker than the small diameter section, and configured at a portion nearer to a press-fitting rear end side with respect to the bracket than the small diameter section; and
   an intermediate section that is configured between the small diameter section and the large diameter section and has a standing surface formed at an outer surface that joins the small diameter surface and the large diameter surface;
   an internal cylinder that is disposed at an inner peripheral side of the external cylinder and is coupled with the other one of the vibration generating section or the vibration receiving section; and
   an elastic body that is interposed between the inner peripheral surface of the external cylinder and an outer peripheral surface of the internal cylinder, and that joins the external cylinder and the internal cylinder to each other,
   wherein the large diameter section is formed at the outer surface, which is press-fitted, of the external cylinder,
   wherein a length of the large diameter section in the cylinder axial direction is greater than a length of the small diameter section in the cylinder axial direction,
   wherein at the external cylinder, a flange section is provided at an outer side in a radial direction of a press-fitting rear end with respect to the bracket,
   wherein the large diameter section is formed from a portion of the external cylinder, which is nearer to the flange than the small diameter section, to the flange,
   wherein the standing surface is tapered such that a diameter of the standing surface increases from the small diameter section towards the large diameter section,
   wherein the large diameter section extends all the way between the flange and the intermediate section and the thickness of the large diameter section remains constant between the flange and the intermediate section, and
   wherein an outer surface of the small diameter section extends in a direction parallel or substantially parallel with an outer surface of the large diameter section.

2. The vibration absorption device according to claim 1, wherein an inner surface of the external cylinder is formed in a linear shape in the cylinder axial direction.

3. The vibration absorption device according to claim 1, wherein the outer diameter of the small diameter section of the external cylinder is equal to or larger than the inner diameter of the bracket before the small diameter section is press-fit into the bracket.

4. The vibration absorption device according to claim 1, wherein the outer diameter of the small diameter section of the external cylinder is equal to or smaller than the inner diameter of the bracket before the small diameter section is press-fit into the bracket.

5. The vibration absorption device according to claim 2, wherein the outer diameter of the small diameter section of the external cylinder is equal to or larger than the inner diameter of the bracket before the small diameter section is press-fit into the bracket.

6. The vibration absorption device according to claim 2, wherein the outer diameter of the small diameter section of the external cylinder is equal to or smaller than the inner diameter of the bracket before the small diameter section is press-fit into the bracket.

7. The vibration absorption device according to claim 1, wherein the small diameter section has a fixed thickness.

\* \* \* \* \*